(12) United States Patent
Amonette et al.

(10) Patent No.: US 10,005,699 B2
(45) Date of Patent: Jun. 26, 2018

(54) NITRIDE-BASED CONTROLLED-RELEASE FERTILIZERS AND PROCESS FOR MAKING SAME

(71) Applicant: BATTELLE MEMORIAL INSTITUTE, Richland, WA (US)

(72) Inventors: James E. Amonette, Richland, WA (US); Josef Matyas, Richland, WA (US)

(73) Assignee: BATTELLE MEMORIAL INSTITUTE, Richland, WA (US)

(*) Notice: Subject to any disclaimer, the term of this patent is extended or adjusted under 35 U.S.C. 154(b) by 89 days.

(21) Appl. No.: 15/222,632

(22) Filed: Jul. 28, 2016

(65) Prior Publication Data

US 2018/0029949 A1    Feb. 1, 2018

(51) Int. Cl.
*C05C 11/00* (2006.01)
*C05G 3/00* (2006.01)

(52) U.S. Cl.
CPC ............ *C05G 3/0094* (2013.01); *C05C 11/00* (2013.01)

(58) Field of Classification Search
CPC .............................. C05G 3/0094; C05C 11/00
See application file for complete search history.

(56) References Cited

U.S. PATENT DOCUMENTS

| 649,941 | A | 5/1900 | Mehner |
| 1,715,041 | A | 11/1922 | Miner |
| 1,894,587 | A | 1/1933 | Hartenstein |
| 2,943,928 | A | 7/1960 | Gueth |
| 5,234,676 | A * | 8/1993 | Howard ............... B01J 13/0008 423/412 |
| 2015/0128671 | A1* | 5/2015 | Ishizaka ............... A01G 9/1086 71/23 |

FOREIGN PATENT DOCUMENTS

| DE | 10253660 A1 | 5/2004 |
| EP | 0592964 A1 | 4/1994 |
| EP | 0918045 A1 | 5/1999 |
| EP | 2868187 A1 | 5/2015 |
| KR | 101345720 B1 * | 12/2013 |
| WO | 9912850 | 3/1999 |

OTHER PUBLICATIONS

International Search Report and Written Opinion for International Application No. PCT/US2017/022164, International Filing Date Mar. 13, 2017, dated Jul. 12, 2017.

(Continued)

*Primary Examiner* — Jennifer A Smith
(74) *Attorney, Agent, or Firm* — Derek H. Maughan

(57) ABSTRACT

A controlled-release solid nitride fertilizer from fly ash and a method for making are described. The fertilizer includes a nitrogen source including at least one solid nitride combined with at least one precipitation-inhibiting agent and with at least one moisture-retention agent, all compressed together to form a porous release structure that in contact with water releases ammonium ions as a nitrogen nutrient at a substantially uniform release rate over a selected release period and thereby maximizes nitrogen-use efficiency by plants.

6 Claims, 3 Drawing Sheets

(56) References Cited

OTHER PUBLICATIONS

Database WPI Week 199536, Thompson Scientific, London, GB, 2017, XP002771708.
Ganesh, I., et al., A non-aqueous processing route for phosphate-protection of AlN powder against hydrolysis, Journal of the European Ceramic Society, 28, 2008, 2281-2288.
Krnel, K., et al., Protection of AlN powder against hydrolysis using aluminum dihydrogen phosphate, Journal of the European Ceramic Society, 21, 2001, 2075-2079.
Krnel, K., et al., Reactivity of Aluminum Nitride Powder in Aqueous Silicon Nitride and Silicon Carbide Slurries, Journal of the American Ceramic Society, 85, 2, 2002, 484-486.
Kudyba-Jansen, A. A, et al., Ca-/-sialon ceramics synthesised from fly ash—preparation, characterization and properties, Materials Research Bulletin, 36, 2001, 1215-1230.
Martin, G., et al., Industrial Nitrogen Compounds and Explosives, Chapter V, Synthetic Ammonia, Crosby Lockwood & Son, London, 1915, 53-58.
Qiu, Q., et al., Carbonitridation of Fly Ash. I. Synthesis of SiAlON-Based Materials, Ind. Eng. Chem. Res., 2005, 44, 2469-2476.
Qiu, Q., et al., Carbonitridation of Fly Ash. II. Effect of Decomposable Additives and Whisker Formation. Ind. Eng. Chem. Res., 44, 2005, 2477-2483.
Qiu, Q., et al., Carbonitridation of Fly Ash. 3. Effect of Indecomposable Additives, Ind. Eng. Chem. Res., 4, 2005, 7352-7358.
Qiu, Q., et al., Carbonitridation of Fly Ash. 4. Hydrolysis of Nitrided Fly Ash, Ind. Eng. Chem. Res., 44, 2005, 7359-7365.
Qiu, Q., et al, Energy Estimation on CRN Process of Fly Ash as a Slow-Release Nitrogen Fertilizer, Ind. Eng. Chem. Res., 49, 2010, 5939-5944.

\* cited by examiner

NITRIDE-BASED CONTROLLED-RELEASE FERTILIZERS AND PROCESS FOR MAKING SAME

STATEMENT REGARDING RIGHTS TO INVENTION MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

FIELD OF THE INVENTION

The present invention relates generally to controlled-release fertilizers and method of production for such.

BACKGROUND OF THE INVENTION

A variety of techniques have been employed to deliver nutrients to growing plants and to extend or delay release of nutrients from the fertilizers. Conventional rapid-release fertilizers generally provide nutrients in the form of water-soluble salts. As a result, nutrients are rapidly available to plants, but also, in some instances, are rapidly leached out of the root zone into ground and surface waters. This loss of nutrients is an economic concern to the grower as well as an environmental concern to communities and ecosystems located downstream who rely on clean sources of water. To minimize nutrient losses, conventional fertilizers are typically applied in small doses multiple times during a typical growing season. Alternatively, controlled-release fertilizers, which employ various methods to slow the release of the water-soluble form of the nutrient, can be applied in a single large application, but these fertilizers are significantly more expensive than conventional fertilizers.

More nitrogen is applied as fertilizer than all other plant nutrients combined, and roughly half of all nitrogen applied globally is not taken up by plants and thus wasted. The dominant form of conventional nitrogen fertilizer is urea; other common forms include anhydrous ammonia, ammonium sulfate, and ammonium nitrate. These compounds either contain or release ammonium ions, which are readily retained by soils. However, soil microbial activity converts ammonium to nitrate, which is not retained by soils and thus easily lost by leaching processes. Nitrogen can also be lost from soils by volatilization of ammonia gas under high pH conditions, and by denitrification processes that yield dinitrogen, nitric oxide, and nitrous oxide gases, the latter of which is a powerful greenhouse gas. Thus, there are many reasons, both economic and environmental, to improve the efficiency of nitrogen usage in agriculture. One promising way is by the use of controlled-release fertilizers timed to provide nitrogen when the plant needs it.

The controlled-release fertilizers currently available typically employ ammonium salts or urea encased by a physical or chemical barrier to slow the solubilization of the fertilizer by water and its subsequent diffusion into the soil. A typical physical barrier is a porous polymer film; sulfur coatings are commonly used as chemical barriers.

In the early part of the twentieth century, aluminum nitride was proposed as a nitrogen fertilizer. Without further modification, this nitride reacts with dissolved silica, alumina, or aluminosilicate ions, which are abundant in soils, to form surface coatings that block access to the surface by water and thus prevent release of a large fraction of the nitrogen it contains. This reaction is one of the reasons for the current dominance of readily soluble ammonium-based fertilizers manufactured by the Haber-Bosch process.

Fly ash is a class of byproducts obtained from the combustion of coal that contain mixtures of various solid oxides, including Si, Al, and Ca. Roughly half of the fly ash that is produced finds other uses, such as substituting for Portland cement in concrete; the remainder is buried in landfills or storage ponds. The oxides in fly ash can be converted to Si, Al, and Ca nitrides by carbothermonitridation or by direct reaction with ammonia under high temperatures. As with pure aluminum nitride, without further treatment these nitrides develop surface coatings that prevent them from releasing a large fraction of their nitrogen in soils. Moreover, the fraction of nitrogen that is released by these untreated nitrides does not follow a near-linear rate to match crop demand for nitrogen, a necessary criterion for a successful slow-release fertilizer. Thus, despite the strong need for new and better slow-release nitrogen fertilizers, to date, solid nitrides have not been seen as practical alternatives. New compositions of fertilizers are needed that do not rely on soluble ammonium salts, provide controlled-release of nitrogen from the fertilizer, and minimize negative effects on the environment. The present invention addresses these needs.

SUMMARY OF THE INVENTION

The present invention is a controlled-release fertilizer composition made up of a generally homogeneous blend including at least one solid nitride and precipitation-inhibiting agent combined and formed into a structure that releases ammonium ions at a substantially uniform release rate over a selected period of time. In various embodiments the nitride may be derived from fly ash and may contain AlN, $Ca_3N_2$, $Ca_3AlN_3$, $CaAlSiN_3$, and other similar nitrides. The precipitation-inhibiting agents are typically materials such as $Ca_2P_2O_7$, $Ca_3(PO_4)_2$, $CaH_4(PO_4)_2$, $K_2HPO_4$, $KH_2PO_4$, $K_4P_2O_7$, $KHCO_3$, $Na_4P_2O_7$. In various applications other materials may also be added to the mixture. Examples include the addition of moisture-retention agents, typically a carbohydrate such as a starch or a cellulose; hydrolysis catalyst materials, such as CaO, $K_2O$, $Na_2O$, $CaCO_3$, $Ca(OH)_2$, and combinations thereof; and finally, aluminum chelating agents such as potassium salts of citrate, acetate, pyrophosphate, acids thereof, and combinations thereof. Each of these can be tailored to provide specific rates of release and nitrogen delivery to meet the needs of a particular user.

In some applications, the homogenous materials are arranged in a porous structure that is created through a process wherein the homogeneous blend is mixed, and in some cases formed into a slurry, before being compressed and/or extruded. These compressed forms are then broken into mechanically robust granules with porous structures to facilitate the entry of water and the subsequent release of nitrogen in the form of ammonium ion.

In one exemplary instance, the solid nitride is aluminum nitride (AlN), the precipitate—inhibiting agent is monopotassium dihydrogen phosphate ($KH_2PO_4$), and the moisture retention agent is starch. The aluminum nitride (AlN) makes up about fifty-five percent by weight of the homogeneous blend and the monopotassium dihydrogen phosphate ($KH_2PO_4$) makes up about forty percent by weight of the homogeneous blend. Starch makes up about five percent by weight of the homogeneous blend. In another example, the solid nitride is aluminum nitride (AlN), the moisture retention agent is starch, and the precipitation-inhibiting agent is dipotassium monohydrogen phosphate ($K_2HPO_4$) with the aluminum nitride (AlN) making up about sixty-eight percent by weight of the homogeneous blend, the starch about five percent and the dipotassium monohydrogen phosphate ($K_2HPO_4$) about twenty-seven percent of the mixture by weight. These exemplary mixtures provided a near-linear release rate of nitrogen nutrient from 0.5% to 1.5% of the total initial nitrogen content per day over a greater than 100-day period.

The purpose of the foregoing abstract is to enable the United States Patent and Trademark Office and the public generally, especially the scientists, engineers, and practitioners in the art who are not familiar with patent or legal terms or phraseology, to determine the nature and essence of the technical disclosure of the application. The abstract is neither intended to define the invention of the application, which is measured by the claims, nor is it intended to be limiting as to the scope of the invention in any way.

DETAILED DESCRIPTION

Figure 1A:
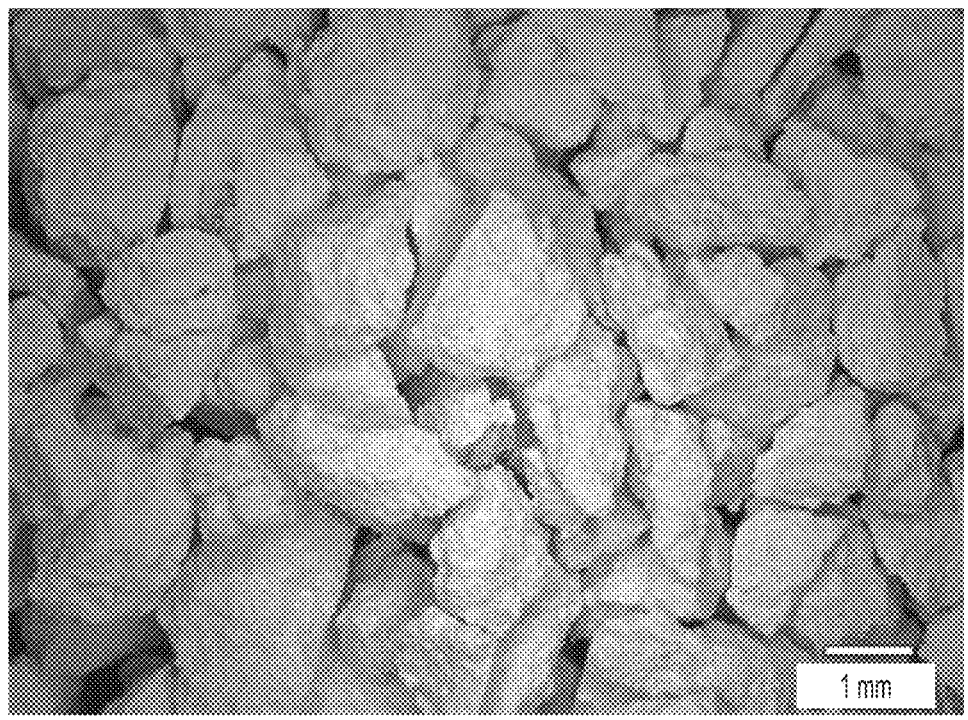
FIG. 1A is an optical microscope image showing exemplary sized granules with a porous structure for a controlled-release fertilizer of the present invention.

The present disclosure includes description of a solid-nitride-based fertilizer composition that releases nitrogen (N) at a controlled and temperature-dependent release rate over an extended period that maximizes nitrogen-uptake efficiencies by crops and minimizes nitrogen losses due to leaching and denitrification. While various modes are shown for carrying out the invention it will be clear that the invention is susceptible to various modifications and alternative constructions. Accordingly, the description of the embodiments provided hereafter should be seen as illustrative only and not limiting.

In one embodiment, a controlled-release fertilizer composition made up of a generally homogeneous blend including at least one solid nitride comprising aluminum (Al), at least one moisture-retention agent, and at least one precipitation-inhibiting agent are combined and formed into a porous structure that releases ammonium ions at a substantially uniform release rate over a selected period of time. In some embodiments the nitride may be derived from fly ash or other aluminosilicate-based materials such as kaolin or feldspar and may contain AlN, $Ca_3N_2$, $Ca_3AlN_3$, $CaAlSiN_3$, and other similar materials. The moisture retention agent is typically a carbohydrate such as a starch or a cellulose. The precipitation-inhibiting agent is typically $Ca_2P_2O_7$, $Ca_3(PO_4)_2$, $CaH_4(PO_4)_2$, $K_2HPO_4$, $KH_2PO_4$, $K_4P_2O_7$, $KHCO_3$, $Na_4P_2O_7$, and combinations thereof. Other materials may also be added to the mixture. Examples include hydrolysis catalyst materials such as CaO, $K_2O$, $Na_2O$, $CaCO_3$, $Ca(OH)_2$, and combinations thereof; and aluminum chelating agents such as potassium salts of citrate, acetate, pyrophosphate, acids thereof, and combinations thereof. Each of these can be tailored to provide specific rates of release and nitrogen delivery to meet the needs of a particular user.

These materials are mixed, and in some cases formed into a slurry, before being compressed and/or extruded. The compressed/extruded forms are then broken into mechanically robust granules with porous structures to facilitate the entry of water and the subsequent release of nitrogen in the form of ammonium ion. The size of the granules typically ranges from about 0.8 mm to about 5 mm.

In one exemplary instance, the solid nitride is aluminum nitride (AlN), the moisture retention agent is starch, and the precipitation—inhibiting agent is monopotassium dihydrogen phosphate ($KH_2PO_4$). The aluminum nitride (AlN) makes up about fifty-five percent by weight of the homogeneous blend and the monopotassium dihydrogen phosphate ($KH_2PO_4$) makes up about forty percent by weight of the homogeneous blend. Starch makes up about five percent by weight of the homogeneous blend. When incubated at 25° C., this mixture provides a near-linear release rate of nitrogen nutrient from 0.5% to 1.5% of the total initial nitrogen content per day over a greater than 100 day period.

In another example, the solid nitride is aluminum nitride (AlN), the moisture retention agent is starch, and the precipitation-inhibiting agent is dipotassium monohydrogen phosphate ($K_2HPO_4$), with the aluminum nitride (AlN) making up about sixty-eight percent by weight of the homogeneous blend, the starch about five percent and the dipotassium monohydrogen phosphate ($K_2HPO_4$) about twenty-seven percent of the mixture by weight. When incubated at 25° C., this mixture provides a near-linear release rate of nitrogen nutrient from 0.5% to 1.5% of the total initial nitrogen content per day over a greater than 100 day period.

Figure 1B:
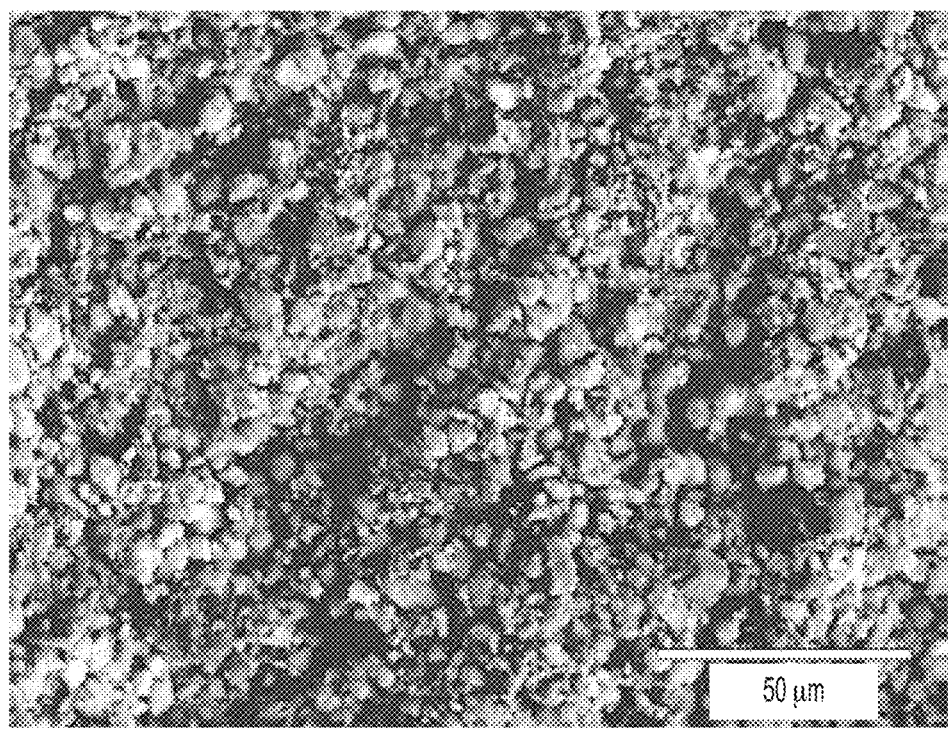
FIG. 1B is a scanning-electron microscope (SEM) image showing the surface of an exemplary granule with individual particles of different compounds that were used to produce the controlled-release fertilizer.
Figure 2:
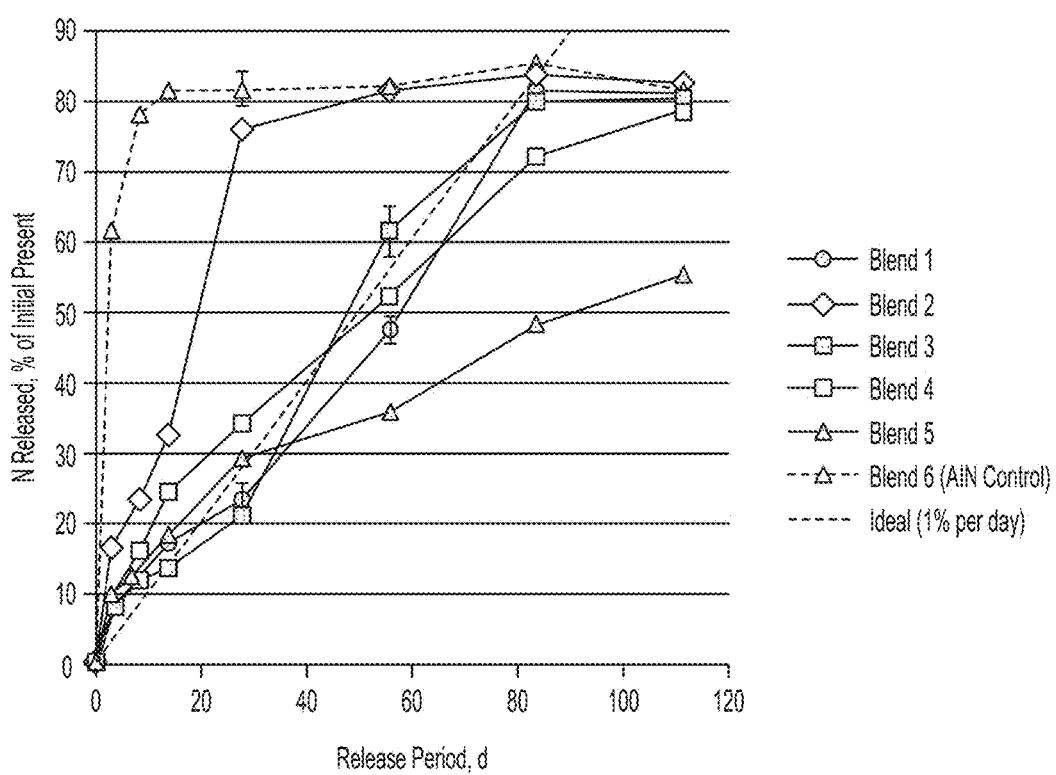
FIG. 2 plots nitrogen-release rates for exemplary controlled-release fertilizers of the present invention.

FIGS. 1 and 2 show various features and embodiments of one disclosure of the invention. Referring first to FIG. 1, there are two images. FIG. 1A shows an optical-microscope image of granules of the present invention having an exemplary size so as to allow for controlled release of nutrients. FIG. 1B shows a scanning-electron-microscope (SEM) image of the surface of a granule that reveals its porous character. The granules are comprised of homogeneous blends of various materials including, principally, a solid nitride and a precipitation-inhibiting agent, as well as other materials beneficial to providing the desired beneficial characteristics of the invention. In some instances, milling of the solid nitride prior to blending with the other constituents may be done to provide better control over the rate of nitrogen release. Subsequent milling of the homogeneous blend provides an intimate contact and uniform distribution of various compounds in the fertilizer blend. In some embodiments, additional milling can assist not only with the mixing but also with the pore size and surface area of the granules which assists in the hydrolysis reactions for releasing the ammonium ions. By varying the time and amount of milling that takes place the release rate of the nitrogen can be modified. Once combined, the fertilizer blends are then compressed or extruded, and then broken to obtain granules with a porous controlled-release structure. In addition to possible milling of the solid nitride, component and concentration selections tune the properties of the resulting fertilizer compositions in the soil environment and can assist in regulating the release of nitrogen nutrient from the fertilizer and matching the release of the fertilizer with the growth cycle of selected crops so as to prevent plant burning or the leaching of excess nutrients into soil or water. Besides the solid nitride, other chemical constituents that could be added include, but are not limited to, precipitation-inhibiting agents, Al-chelating agents, hydrolysis catalysts, pH buffers, moisture-retention agents, and various oxides that increase N, P, and K contents in the fertilizer.

The precipitation-inhibiting reagents and aluminum-chelating agents minimize formation of precipitates at the surface of the fertilizer granules in the soil. Precipitation-inhibiting agents include, but are not limited to potassium, calcium, or phosphate-containing salts such as $Ca_2P_2O_7$, $Ca_3(PO_4)_2$, $CaH_4(PO_4)_2$, $K_2HPO_4$, $KH_2PO_4$, $K_4P_2O_7$, $KHCO_3$, $Na_4P_2O_7$, and combinations thereof. Chelating reagents include, but are not limited to, potassium salts of citrate, acetate, pyrophosphate, acids thereof, and combinations thereof. Concentrations of precipitation-inhibiting reagents and chelating agents can range from about 0.01% to about 50% by weight. Depending upon the needs of a user other materials and fertilizers may also be added to the compositions and include selected potassium (K) and phosphorus (P) oxides such as $P_2O_5$ and $K_2O$, and other potassium-containing hydrogen phosphate salts that increase the K and P contents in the fertilizer blends. Amounts of other additives such as potassium hydrogen phosphate salts can range from about 13% to about 41%.

Hydrolysis catalysts (promoters) suitable for buffering pH of nitrides in the fertilizer include, but are not limited to calcium oxide (CaO), potassium oxide ($K_2O$), sodium oxide ($Na_2O$), calcium hydroxide [$Ca(OH)_2$], calcium carbonate ($CaCO_3$), potassium phosphates [$KH_2PO_4$, $K_2HPO_4$, $K_3PO_4$ (orthophosphate), $K_4P_2O_7$ (pyrophosphate)], urea ($CH_4N_2O$), and combinations of these various catalysts. Concentration of the hydrolysis catalyst typically ranges from about 0.01% to about 30% by weight. Choice of hydrolysis catalyst can be varied depending upon the particular needs of the user and the conditions under which the fertilizer is to be used. In some embodiments, these materials can be provided as basic elements in the fertilizer at concentrations to buffer local pH and provide a selected or desired rate of hydrolysis. In some of these situations CaO is used because it dissolves at a sufficiently slow rate such that it does not leave the fertilizer blend before the nitride hydrolysis reaction is complete. Moisture-retention reagents include, but are not limited to, celluloses, starches, and combinations of starches and celluloses. These would typically range from 0.01% to about 6% by weight of the mixture.

In some embodiments of the invention, fly ash is used as a precursor and source of the nitrides used in the fertilizers. In one particular embodiment this fly ash contained the following constituent parts in the following weight percentages: C 0.26; $SiO_2$ 33.80; $Al_2O_3$ 18.72; $Fe_2O_3$ 6.23; $SO_3$ 1.86; CaO 22.57; MgO 4.68; $Na_2O$ 1.42; $K_2O$ 0.62; $TiO_2$ 1.35; $P_2O_5$ 1.18; $Mn_2O_3$ 0.03; SrO 0.31; and BaO 0.65.

This fly ash may be treated by crushing and milling the fly ash (or other ash) to form uniform powders, then mixing those powders with other materials such as reductants and then heating them in the presence of a nitridation gas to drive off oxygen and react with the nitride precursor to form a nitride product. Examples of such reductants include, but are not limited to reduced carbon, hydrazine, ammonia, ammonia gas, or a combination of these reagents. In some embodiments, the supplemental reductant is a reduced carbon, which is mixed with the oxide precursor material in a selected ratio prior to introduction in the nitridation reactor. In some embodiments, the reductants may make up about 27 wt % to approximately 30 wt % of the mixture. Temperatures selected for nitridation of the nitride precursor materials vary depending on the components introduced in the oxide source materials. Typically nitridation temperatures range from about 1200° C. to about 1600° C. In one example embodiment, 50 g of the compressed granules of oxide precursors are heated in a stream of $N_2$ gas flowing through a cross sectional area of about 16 $cm^2$ at a rate of from about 1 L per min to about 1.5 L per min at a temperature ramp rate of about 5° C. per minute to a reaction temperature of about 1350° C. The materials are then left under these conditions until materials with the desired characteristics result.

Example 1

Six nitride fertilizer blends of the present invention were synthesized using commercially available AlN (Aldrich, 10 μm powder, >98%), $Ca_2P_2O_7$(Aesar, 99.99%), $K_2HPO_4$ (J. T. Baker, 99.4%), $KH_2PO_4$ (Sigma, 99.0%), $KHCO_3$ (Sigma-Aldrich, 99.7%), KCl (Mallinckrodt, analytical reagent), CaO (Alfa Aesar, 99.95%), and starch (Penford Products Co.) as follows. Ingredients selected for each blend were pre-mixed and then homogenized in an agate mill for 5 minutes. About 1.5 g of each homogenized blend was pressed into a single large pellet under a compression pressure of about 103 MPa (1050 kg/$cm^2$) using a press. The pellet was then crushed with a mortar and pestle into smaller granules and sieved to provide granules with a particle size between about 0.85 mm and about 2 mm. These granules had a composition containing uniformly distributed and intimately mixed ingredients that are readily accessible to water. TABLE 1 shows compositions of selected nitride fertilizer blends of the present invention.

TABLE 1

| Component | Blend 1 | Blend 2 | Blend 3 | Blend 4 | Blend 5 | Blend 6 (AlN Control) |
|---|---|---|---|---|---|---|
| N—$P_2O_5$—$K_2O$* | 23-11-14 | 17-17-12 | 21-9-18 | 19-21-14 | 17-17-17 | 32-0-0 |
| AlN | 68.3 | 50.8 | 50.6 | 54.3 | 51.9 | 95.0 |
| Starch | 5.0 | 5.0 | 5.0 | 5.0 | 5.0 | 5.0 |
| $Ca_2P_2O_7$ | — | 15.5 | — | — | 7.1 | — |
| $K_2HPO_4$ | 26.7 | 21.4 | 21.4 | — | 32.5 | — |
| $KH_2PO_4$ | — | — | — | 40.7 | — | — |
| $KHCO_3$ | — | — | 13.0 | — | — | — |
| KCl | — | — | 14.2 | — | — | — |
| CaO | — | 7.3 | — | — | 3.5 | — |

*Concentrations of N, $P_2O_5$, and $K_2O$ are reported in wt %

The various selected blends were tested for nitrogen (N) release and release duration using an incubation procedure. About 60 mg of each fertilizer blend were suspended in 6.5 mL of a filter-sterilized soil extract containing about 20 ppm of dissolved $SiO_2$. Although silica precipitates on the AlN surface, the amount of silica (a total of 130 μg) was insufficient to completely block N release. Blends were incubated in a sealed test container for up to 112 days (16 weeks) at a temperature of 25° C. to approximate the length of a typical growing season. Nitrogen released during this period was measured by determining the amount of ammonia ($NH_3$) gas captured by 20 mL of a 5 wt % boric acid ($H_3BO_3$) solution, which was maintained in a separate compartment inside the closed container. Determinations were made using an ammonium ion-selective electrode after diluting aliquots of the $H_3BO_3$ in a NaCl ionic-strength buffer.

FIG. 2 plots nitrogen-release results for five selected blends containing AlN, starch, and other selected additives against a control consisting of AlN at a concentration of 95 percent by weight and starch, at a concentration of 5 percent by weight, as a function of time. Also plotted is a dashed line showing the ideal release rate of 1 percent of the total N per day. All of the blends, as well as the control, showed a near-linear release rate until they near the maximum N release of about 80 percent of the initial N present. Three blends (Blends 1, 3, and 4) showed nearly ideal N-release rates over the course of the 112-day experiment. The AlN control and Blend 2 released N much faster than the ideal rate, whereas Blend 5 released N much more slowly than the ideal rate. The results thus show the ability to control the rates of N release from a solid nitride over the course of a typical growing season by altering the composition of the homogeneous blend.

Example 2

TABLE 2 presents the compositions of three other exemplary slow-release fertilizers of the present disclosure. These blends contain different nitrides (AlN, and a nitrided fly ash), but have the same additives (starch and dipotassium monohydrogen phosphate) to control N release. Blends 8 and 9 have identical compositions, but differ in that the nitrided fly ash in Blend 9 is milled after nitridation to achieve a smaller nitride particle size before incorporation into the blend.

TABLE 2

| Component | Blend 7 | Blend 8 | Blend 9 |
|---|---|---|---|
| $N-P_2O_5-K_2O$* | 17-21-14 | 12-21-14 | 12-21-14 |
| AlN | 54.3 | — | — |
| Nitrided Fly Ash | — | 54.3 | — |
| Milled Nitrided Fly Ash | — | — | 54.3 |
| Starch | 5.0 | 5.0 | 5.0 |
| $K_2HPO_4$ | 40.7 | 40.7 | 40.7 |

Figure 3:
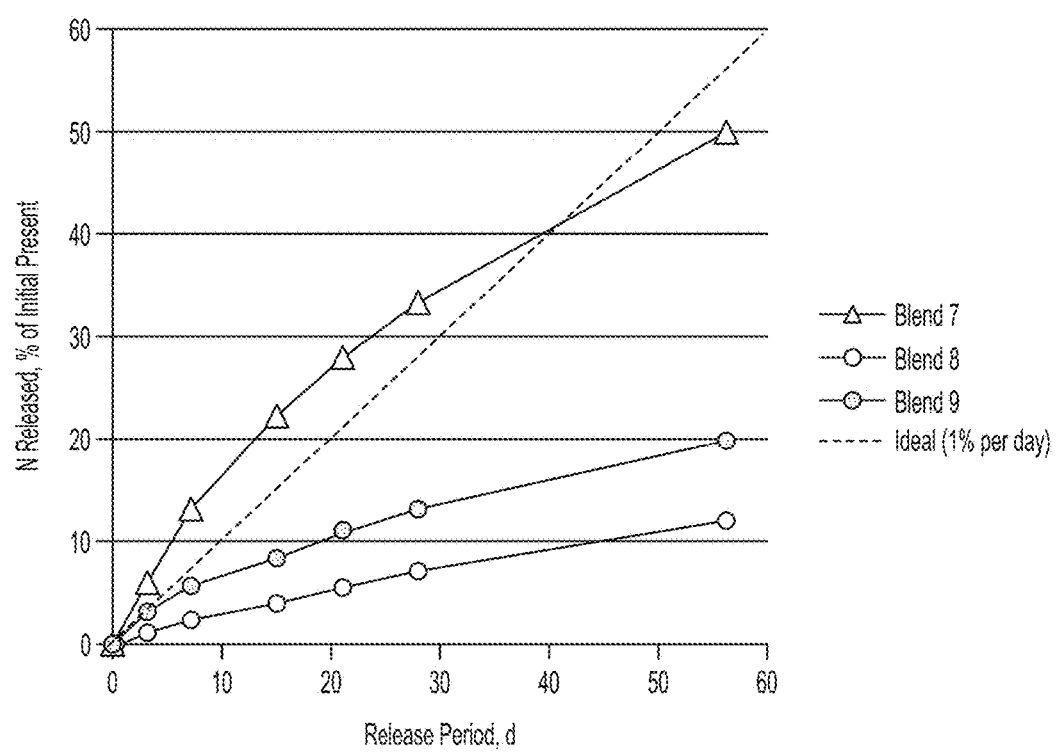
FIG. 3 plots nitrogen-release rates for a second set of exemplary controlled-release fertilizers of the present invention.

The nitrogen release properties of these three blends were tested under experimental conditions identical to those described in Example 1, except that 200 mg of nitride were used, the incubation temperature was 18.5° C., and the release period for which data are reported is 56 days. FIG. 3 shows the results of these nitrogen release tests. Near-linear release was obtained for the three blends, with the release rate for Blend 7 (AlN) being slightly faster than ideal and those for Blends 8 and 9 being slightly slower than the ideal rate. Milling of the nitrided fly ash (Blend 9) nearly doubled the nitrogen release rate when compared to the un-milled blend (Blend 8). Because of the lower incubation temperature, the release rates will be slower than at 25° C.

The results in TABLE 2 and FIG. 3 show that by blending solid nitrides (such as AlN) with selected additives including, for example, the starch and dipotassium monohydrogen phosphate ($K_2HPO_4$) described herein, and by milling the nitride to alter its particle size (and thereby its reactive surface area), that an N-delivery package that provides controlled release of N can be prepared.

TABLE 3 summarizes the compositions of nine fertilizer blends described herein and lists the suggested ranges of the various additives in various embodiments. It will be apparent to those skilled in the art that many changes and modifications may be made without departing from the invention in its true scope and broader aspects.

TABLE 3

| Nitride | 1 | 2 | 3 | 4 | 5 | 6 | 7 | 8 | 9 |
|---|---|---|---|---|---|---|---|---|---|
| AlN | 68.3 | 50.8 | 50.6 | 54.3 | 51.9 | 95 | 54.3 | — | — |
| Nitrided Fly Ash | — | — | — | — | — | — | — | 54.3 | — |
| Milled Nitrided Fly Ash | — | — | — | — | — | — | — | — | 54.3 |
| CaO [0.001% to 66%] | — | 7.3 | — | — | 3.5 | — | — | — | — |
| Starch [0.001% to 10%] | 5.0 | 5.0 | 5.0 | 5.0 | 5.0 | 5.0 | 5.0 | 5.0 | 5.0 |
| $Ca_2P_2O_7$ [0.001% to 20%] | — | 15.5 | — | — | 7.1 | — | — | — | — |
| $K_2HPO_4$ [0.001% to 66%] | 26.7 | 21.4 | 21.4 | — | 32.5 | — | 40.7 | 40.7 | 40.7 |
| $KH_2PO_4$ [0.001% to 66%] | — | — | — | 40.7 | — | — | — | — | — |
| $KHCO_3$ [0.001% to 66%] | — | — | 13.0 | — | — | — | — | — | — |

TABLE 3-continued

| Nitride | 1 | 2 | 3 | 4 | 5 | 6 | 7 | 8 | 9 |
|---|---|---|---|---|---|---|---|---|---|
| KCl [0.001% to 66%] | — | — | 14.2 | — | — | — | — | — | — |
| TOTAL % | 100 | 100 | 100 | 100 | 100 | 100 | 100 | 100 | 100 |
| N—$P_2O_5$—$K_2O$ basis* | 23 | 17 | 21 | 19 | 17 | 32 | 17 | 12 | 12 |
|  | 11 | 17 | 9 | 21 | 17 | 0 | 21 | 21 | 21 |
|  | 14 | 12 | 18 | 14 | 17 | 0 | 14 | 14 | 14 |

*Numbers correspond to concentrations of N, $P_2O_5$, and $K_2O$ in wt %, respectively.

While exemplary embodiments of the present invention have been shown and described, it will be apparent to those skilled in the art that many changes and modifications may be made without departing from the invention in its true scope and broader aspects. The appended claims are therefore intended to cover all such changes and modifications as fall within the true spirit and scope of the invention.

What is claimed is:

1. A controlled-release fertilizer composition comprising: a homogeneous blend having at least one solid nitride selected from the group consisting of AlN, Ca3N2, Ca3AlN3, CaAlSiN3, and combinations thereof;
   at least one precipitation-inhibiting agent selected from the group consisting of Ca2P2O7, Ca3(PO4)2, CaH4(PO4)2, K2HPO4, KH2PO4, K4P2O7, KHCO3, Na4P2O7, and combinations thereof;
   at least one moisture retention agent selected from the group consisting of starch, cellulose, or combinations thereof; and
   at least one hydrolysis catalyst selected from the group consisting of CaO, K2O, Na2O, CaCO3, Ca(OH)2, and combinations thereof;
   wherein the solid nitride, the precipitation-inhibiting reagent, the hydrolysis catalyst and the moisture-retention agent are combined in a granule with a porous structure that releases ammonium ions at a substantially uniform release rate over a selected period of time.

2. The composition of claim 1, further comprising at least one aluminum-chelating agent selected from the group consisting of potassium salts of citrate, acetate, pyrophosphate, acids thereof, and combinations thereof.

3. A controlled-release fertilizer composition, comprising: a homogeneous blend having a solid aluminum nitride (AlN) that makes up at least fifty percent by weight of the homogeneous blend, a monopotassium dihydrogen phosphate (KH2PO4) precipitation agent that makes up about twenty percent by weight of the homogeneous blend, a moisture-retention agent that makes up about five percent by weight of the homogenous blend, with the homogenous blend of materials being arranged in a porous structure; wherein
   the at least one moisture retention agent is selected from the group consisting of starch, cellulose, or combinations thereof.

4. The composition of claim 1 wherein the at least one precipitation-inhibiting agent is dipotassium monohydrogen phosphate ($K_2HPO_4$).

5. The composition of claim 3, wherein nitrogen is released at a rate of from 0.5% to 1.5% of a total initial nitrogen content per day when reacted in water at a temperature of 25° C.

6. A process for making a solid nitride-containing fertilizer, comprising the step of compressing a homogeneous blend comprising at least one solid nitride comprising aluminum (Al), calcium (Ca), or Al and Ca, at least one moisture-retention agent, and at least one precipitation-inhibiting agent together by extruding a wet and congealed form of the homogeneous blend through an extrusion device then compressing using a compression pressure of at least about 30 MPa.

* * * * *